United States Patent
Van Der Veer et al.

(10) Patent No.: US 10,544,378 B2
(45) Date of Patent: Jan. 28, 2020

(54) FLUID COMPRISING METHANE AND A TRACER, AND PROCESSES FOR PRODUCING IT AND THE USE THEREOF

(71) Applicant: SHELL OIL COMPANY, Houston, TX (US)

(72) Inventors: Wouter Martinus Van Der Veer, Rijswijk (NL); Stuart Meredith MacDonald, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 105 days.

(21) Appl. No.: 15/770,678

(22) PCT Filed: Oct. 20, 2016

(86) PCT No.: PCT/EP2016/075203
§ 371 (c)(1),
(2) Date: Apr. 24, 2018

(87) PCT Pub. No.: WO2017/072017
PCT Pub. Date: May 4, 2017

(65) Prior Publication Data
US 2019/0055486 A1    Feb. 21, 2019

(30) Foreign Application Priority Data

Oct. 26, 2015  (EP) .................................. 15191520

(51) Int. Cl.
| | | |
|---|---|---|
| *C10L 3/00* | (2006.01) | |
| *C10L 3/06* | (2006.01) | |
| *C10L 1/16* | (2006.01) | |
| *C10L 1/19* | (2006.01) | |
| *C10L 1/24* | (2006.01) | |
| *B01F 3/08* | (2006.01) | |

(52) U.S. Cl.
CPC ....... *C10L 3/006* (2013.01); *B01F 2003/0888* (2013.01); *C10L 1/1608* (2013.01); *C10L 1/19* (2013.01); *C10L 1/2406* (2013.01); *C10L 2230/10* (2013.01); *C10L 2230/16* (2013.01); *C10L 2270/10* (2013.01); *C10L 2290/06* (2013.01); *C10L 2290/141* (2013.01); *C10L 2290/24* (2013.01)

(58) Field of Classification Search
CPC combination set(s) only.
See application file for complete search history.

(56) References Cited

U.S. PATENT DOCUMENTS

| | | | |
|---|---|---|---|
| 1,429,982 A * | 9/1922 | Mazelli | ..................... F16D 1/04 403/276 |
| 3,761,232 A | 9/1973 | Klass et al. | |
| 4,025,315 A | 5/1977 | Mazelli | |
| 4,487,613 A * | 12/1984 | Yoshida | .................. C10L 3/006 116/214 |
| 2003/0051394 A1 | 3/2003 | Towfighi | |
| 2004/0031314 A1 * | 2/2004 | Flynn | ........................ C01B 3/00 73/40.7 |
| 2004/0072051 A1 | 4/2004 | Murata et al. | |
| 2011/0155616 A1* | 6/2011 | Eh | .......................... C10L 3/006 206/524.1 |

FOREIGN PATENT DOCUMENTS

EP         0203661 A2    12/1986

OTHER PUBLICATIONS

International Search Report and Written Opinion received for PCT Patent Application No. PCT/EP2016/075203, dated Jan. 4, 2017, 9 pages.

* cited by examiner

*Primary Examiner* — Kaity V Chandler

(57) ABSTRACT

A labelled methane, such as LNG, has methane and a tracer, in the form of a slush of liquids and solids. The invention especially relates to LNG having a tracer. The labelled methane may comprise, in addition to the tracer, an odorant, and a carrier for the odorant. The odorant is ethyl acetate and/or ethyl mercaptan. The carrier for the odorant is propane, n-butane, iso-butane, or a mixture of two or more thereof. A process for preparing the liquid or slush involves liquefying a gas comprising methane and tracer.

17 Claims, No Drawings

FLUID COMPRISING METHANE AND A TRACER, AND PROCESSES FOR PRODUCING IT AND THE USE THEREOF

CROSS REFERENCE TO RELATED APPLICATIONS

This is a national stage application of International application No. PCT/EP2016/075203, filed 20 Oct. 2016, which claims benefit of priority of European application No. 15191520.4, filed 26 Oct. 2015.

FIELD OF THE INVENTION

The invention relates to a fluid comprising methane and a tracer. This is also referred to as a labelled methane comprising fluid. The invention also relates to processes for producing labelled methane comprising fluids, and the use thereof. The invention especially relates to LNG comprising a tracer (labelled LNG), and processes for producing it, and the use of LNG comprising a tracer.

BACKGROUND TO THE INVENTION

Methane comprising fluids can be derived from a number of sources, such as natural gas or petroleum reservoirs, aerobic or anaerobic digestion of biological material, or from a synthetic source such as a Fischer-Tropsch process.

Aerobic or anaerobic digestion of biological material can have many forms. It may, for example, concern aerobic or anaerobic digestion of dairy waste. Aerobic or anaerobic digestion of biological material results in a methane comprising fluid which may also be referred to as bio-methane, bio-gas or bio-fuel.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas).

In this text the term natural gas is used to refer to methane comprising streams originating from any source.

The term methane comprising fluid is used in this text to refer to fluids comprising at least 40 m/m % methane. The term in particular relates to natural gas fluids. Similarly, the terms methane comprising gas, methane comprising liquid, and methane comprising slush of liquid and solids, refer to gas, liquid, and slush of liquid and solids comprising at least 40 m/m % methane. A methane comprising fluid may comprise up to 100 m/m % methane, especially up to 99.9 m/m % methane, it may comprise up to 99 m/m % methane, it may comprise up to 90 m/m % methane. In the context of this invention a slush of liquid and solids is considered a fluid. The term methane comprising gas in particular relates to natural gas. The terms methane comprising liquid, and methane comprising slush of liquid and solids, in particular relate to LNG.

Natural gas is a useful fuel source, as well as a source of various hydrocarbon compounds. It is often desirable to liquefy natural gas in a liquefied natural gas (LNG) plant at or near the source of a natural gas stream to enable compact storage and/or efficient transport of the natural gas over long distances. Natural gas can be more easily stored and transported in a liquid form than in a gaseous form because it occupies a smaller volume.

Liquefied natural gas plants are well known in the field and comprise the following processing steps:
  optionally treating the methane comprising stream by removing impurities in a treating stage, such as water, acid gases, mercury,
  optionally removing natural gas liquids from the methane comprising stream in a NGL stage, such as ethane, propane, butane and heavier components,
  cooling the methane comprising stream in one or more cooling stages, for instance a pre-cooling stage and a main cooling stage, and
  optionally flashing the methane comprising stream in an end-flash stage and,
  optionally, storing the liquefied natural gas in a storage tank.

Methane comprising gas, such as natural gas is obtained from various sources. After liquefaction it is transported worldwide as LNG. LNG and regasified LNG are used for different purposes.

Different countries and different purposes may have different requirements. This may relate to safety, proper use and/or tax regimes.

There is a need for a possibility to trace methane comprising liquid and slush. There thus is a need for a method of labeling, or marking, methane comprising liquid and slush.

SUMMARY OF THE INVENTION

The present invention relates to a liquid comprising methane and a tracer. This can also be referred to as a traceable methane comprising fluid. This can also be referred to as a tagged, a marked, a fingerprinted or a labelled methane comprising fluid. The invention also relates to a slush of liquids and solids comprising methane and a tracer, i.e. a labelled methane comprising slush of liquids and solids. The invention especially relates to labelled LNG, whereby the LNG can be a liquid, or a slush of liquid and solids.

A tracer compound may be used as a kind of fingerprint, or label. It may, for example, be used to indicate the source of the methane comprising fluid. Alternatively, it may be used to indicate the purpose of the methane comprising fluid, for example for domestic use or for industrial use. The presence of a tracer in a methane comprising fluid may be determined by means of any suitable commonly used gas detector. The tracer is methyl acetate.

One tracer compound, or several kinds of tracer compounds, or one or more tracer compounds and one or more odorants can be used as a kind of fingerprint, or label. The present invention also relates to a process for preparing such a labelled liquid or slush by liquefying labelled methane comprising gas. The invention also relates to a process in which a tracer is added to a methane comprising liquid or slush.

In more detail, the present invention relates to a labelled methane comprising fluid comprising:
  a methane comprising fluid,
  in the range of from 1 to 250 ppm, preferably 1 to 100 ppm, more preferably 1 to 50 ppm methyl acetate, calculated on the total mass of the labelled methane comprising fluid;
whereby the labelled methane comprising fluid is a liquid, or a slush of liquid and solids, and whereby the labelled methane comprising fluid preferably is at a temperature in the range of from −62° C. to −185° C., and at a pressure in the range of from 20 mbara to 120 bara, preferably 250 mbara to 76 bara.

The present invention further relates to a process for preparing a labelled methane comprising fluid comprising in the range of from 1 to 250 ppm, preferably 1 to 100 ppm, more preferably 1 to 50 ppm methyl acetate, the process comprising the following step:
a) adding methyl acetate to a methane comprising liquid, or a methane comprising slush of liquid and solids,
whereby the liquid or slush comprising methane preferably is at a temperature in the range of from −62° C. to −185° C., and at a pressure in the range of from 20 mbara to 120 bara, preferably 250 mbara to 76 bara.

The present invention also relates to a process for preparing a labelled methane comprising fluid comprising in the range of from 1 to 250 ppm, preferably 1 to 100 ppm, more preferably 1 to 50 ppm methyl acetate, the process comprising the following steps:
a) adding methyl acetate to a methane comprising gas, whereby the methane comprising gas preferably is at a temperature in the range of from −40 to +200° C., more preferably −25 to +85° C., and;
b) liquefying the mixture obtained in step a) to a temperature in the range of from −62° C. to −185° C. and a pressure in the range of from 20 mbara to 120 bara, preferably 250 mbara to 76 bara.

It was found that the present invention solves the need for a possibility to trace methane comprising liquid and slush.

DETAILED DESCRIPTION OF THE INVENTION

The invention relates to a fluid comprising methane and a tracer. The invention also relates to processes for producing labelled methane comprising fluids, and the use thereof. The invention especially relates to LNG comprising a tracer (labelled LNG), and processes for producing it, and the use of LNG comprising a tracer. The tracer, and optionally an odorant, may, for example, be added at natural gas production facilities, at an LNG terminal, or at a retail station. The tracer, and optionally an odorant, may be added to a methane comprising fluid before or after liquefaction.

Labelled Methane Comprising Liquid or Slush

The present invention relates to a labelled methane comprising liquid, and to a labelled methane comprising slush of liquid and solids. The invention especially relates to labelled LNG, whereby the LNG can be a liquid, or a slush of liquid and solids.

The present invention relates to a labelled methane comprising fluid comprising:
a methane comprising fluid,
in the range of from 1 to 250 ppm, preferably 1 to 100 ppm, more preferably 1 to 50 ppm methyl acetate, calculated on the total mass of the labelled methane comprising fluid. The labelled methane comprising fluid is a liquid, or a slush of liquid and solids. The labelled methane comprising fluid preferably is at a temperature in the range of from −62° C. to −185° C., and at a pressure in the range of from 20 mbara to 120 bara, preferably 250 mbara to 76 bara.

When transporting, storing, or handling a methane comprising liquid or slush, normally boil off gas is created due to heat ingress. Thus, there is a need for an odorized methane comprising liquid or slush so that low concentrations of boil off gas in air can be easily detected by people.

Odorants for a methane comprising liquid or slush, however, need to fulfill a number of requirements. The odorant needs to have a good solubility in a methane comprising liquid or slush at very low temperatures, even at temperatures around −162° C., or even −185° C. Furthermore, the odorant needs to remain in the methane comprising fluid when it transfers from the liquid phase to the gas phase. Additionally, the odorant needs to have a sufficiently low odor threshold value.

In a preferred embodiment the labelled methane comprising fluid according to the invention additionally comprises an odorant. Highly suitable odorants are ethyl acrylate, ethyl mercaptan, and a mixture thereof.

Preferably the labelled methane comprising fluid additionally comprises:
in the range of from 1 to 100 ppm of an odorant,
in the range of from 0.1 to 10 m/m % of a carrier, calculated on the total mass of the labelled methane comprising fluid. The carrier is propane, n-butane, iso-butane, or a mixture of two or more thereof. The odorant is ethyl acrylate, ethyl mercaptan, or a mixture thereof.

Odorant and carrier preferably are used in a ratio of from 1:20 to 1:50000, more preferably 1:100 to 1:5000, even more preferably 1:650 to 1:1500.

Preferably the labelled methane comprising fluid comprises 2 to 10 ppm odorant, and preferably 0.2 to 1 m/m % carrier, calculated on the total mass of the labelled methane comprising fluid.

Preferably the labelled methane comprising fluid comprises 4 to 6 ppm odorant, and preferably 0.4 to 0.6 m/m % carrier, calculated on the total mass of the labelled methane comprising fluid.

Preferably the carrier is iso-butane.

Preferably the odorant is ethyl acrylate or a mixture of ethyl acrylate and ethyl mercaptan.

Process in which a Tracer is Added to Liquid or Slush

The present invention also relates to a process in which a tracer is added to a methane comprising liquid or slush. Preferably a labelled methane comprising liquid or slush according to the invention is obtained. All embodiments of the labelled methane comprising liquid or slush as described above can be obtained with this process.

The invention relates to a process for preparing a labelled methane comprising fluid comprising in the range of from 1 to 250 ppm, preferably 1 to 100 ppm, more preferably 1 to 50 ppm methyl acetate, the process comprising the following step:
a) adding methyl acetate to a methane comprising liquid, or a methane comprising slush of liquid and solids, whereby the liquid or slush comprising methane preferably is at a temperature in the range of from −62° C. to −185° C., and at a pressure in the range of from 20 mbara to 120 bara, preferably 250 mbara to 76 bara.

Preferably methyl acetate, an odorant and a carrier for the odorant are added to a methane comprising liquid or slush. Preferably the process comprises the following step: a) adding methyl acetate, and in the range of from 1 to 100 ppm of an odorant, and in the range of from 0.1 to 10 m/m % of a carrier to a methane comprising liquid, or a methane comprising slush of liquid and solids,
whereby the odorant and carrier are added separately and/or mixed, and
whereby the methyl acetate is added separately and/or mixed with odorant and/or carrier, and
whereby the carrier is propane, n-butane, iso-butane, or a mixture of two or more thereof, and whereby the odorant is ethyl acrylate, ethyl mercaptan, or a mixture thereof.

Odorant and carrier preferably are used in a ratio of from 1:20 to 1:50000, more preferably 1:100 to 1:5000, even more preferably 1:650 to 1:1500.

Preferably the obtained labelled methane comprising fluid comprises 2 to 10 ppm odorant, and preferably 0.2 to 1 m/m % carrier, calculated on the total mass of the labelled methane comprising fluid.

Preferably the obtained labelled methane comprising fluid comprises 4 to 6 ppm odorant, and preferably 0.4 to 0.6 m/m % carrier, calculated on the total mass of the labelled methane comprising fluid.

Preferably the carrier is iso-butane.

Preferably the odorant is ethyl acrylate or a mixture of ethyl acrylate and ethyl mercaptan.

Preferably step a) of the process is performed by:
a1) adding odorant to carrier and
a2) adding at least a part of the mixture obtained in step a1) to a methane comprising liquid, or a methane comprising slush of liquid and solids, and
adding methyl acetate separately and/or mixed with odorant and carrier.

Preferably a stream comprising a tracer and/or an odorant is added to a gas stream, a liquid stream, or a stream of a slush of liquid and solids, using a flow controller, e.g. a control valve, or an injection pump, e.g. a fixed volume injection pump, and a PLC (programmable logic controller).

Process in which a Tracer is Added to Gas, Followed by Liquefaction

The present invention also relates to a process for preparing a labelled liquid or slush by liquefying a methane comprising gas which comprises a tracer. Preferably a labelled methane comprising liquid or slush according to the invention is obtained. All embodiments of the labelled methane comprising liquid or slush as described above can be obtained with this process.

The invention relates to a process for preparing a labelled methane comprising fluid comprising in the range of from 1 to 250 ppm, preferably 1 to 100 ppm, more preferably 1 to 50 ppm methyl acetate, the process comprising the following steps:
a) adding methyl acetate to a methane comprising gas, whereby the methane comprising gas preferably is at a temperature in the range of from −40 to +200° C., more preferably −25 to +85° C., and;
b) liquefying the mixture obtained in step a) to a temperature in the range of from −62° C. to −185° C. and a pressure in the range of from 20 mbara to 120 bara, preferably 250 mbara to 76 bara.

Preferably step a) is performed as follows:
a) adding methyl acetate, and in the range of from 1 to 100 ppm of an odorant, and in the range of from 0.1 to 10 m/m % of a carrier to a methane comprising gas,
whereby the odorant and carrier are added separately and/or mixed, and
whereby the methyl acetate is added separately and/or mixed with odorant and/or carrier, and
whereby the carrier is propane, n-butane, iso-butane, or a mixture of two or more thereof, and whereby the odorant is ethyl acrylate, ethyl mercaptan, or a mixture thereof.

Odorant and carrier preferably are used in a ratio of from 1:20 to 1:50000, more preferably 1:100 to 1:5000, even more preferably 1:650 to 1:1500.

Preferably the obtained labelled methane comprising fluid comprises 2 to 10 ppm odorant, and preferably 0.2 to 1 m/m % carrier, calculated on the total mass of the labelled methane comprising fluid.

Preferably the obtained labelled methane comprising fluid comprises 4 to 6 ppm odorant, and preferably 0.4 to 0.6 m/m % carrier, calculated on the total mass of the labelled methane comprising fluid.

Preferably the carrier is iso-butane.

Preferably the odorant is ethyl acrylate or a mixture of ethyl acrylate and ethyl mercaptan.

Preferably steps a) and b) of the process are performed by:
a1) adding odorant to carrier, and
a2) adding at least a part of the mixture obtained in step a1) to a methane comprising gas,
whereby the methane comprising gas preferably is at a temperature in the range of from −40 to +200° C., more preferably −25 to +85° C., and
adding the methyl acetate separately and/or mixed with odorant and carrier, and
b) liquefying the mixture obtained in step a2) to a temperature in the range of from −62° C. to −185° C. and a pressure in the range of from 20 mbara to 120 bara, preferably 250 mbara to 76 bara.

Preferably a stream comprising a tracer and/or an odorant is added to a gas stream, a liquid stream, or a stream of a slush of liquid and solids, using a flow controller, e.g. a control valve, or an injection pump, e.g. a fixed volume injection pump, and a PLC (programmable logic controller).

Use

The invention further relates to the use of a labelled methane comprising fluid according to the invention, or prepared in a process according to the invention, as fuel in automotive industry, marine industry, or for power generation.

EXAMPLES

Labelled LNG samples were prepared according to the invention. Additional samples were prepared by using different odorants. A tracer or an odor was added to natural gas, followed by liquefaction in a cryostat. The labelled or odorized natural gas was analyzed before and after liquefaction.

The results are summarized in the following tables.
Sample Preparation:

| Sample | Odorant | Concentration added to natural gas [ppm] | Concentration in liquid phase after liquefaction [ppb] |
| --- | --- | --- | --- |
| A | Ethyl acrylate | 5 | 550 ± 12% RSD |
| B | Ethyl acrylate | 5 | 5000 ± 2.6% RSD |
| C | Methyl acrylate | 5 | 350 ± 8% RSD |
| D | Methyl acetate | 5 | 4000 ± 20% RSD |
| E | t-butyl mercaptan | 1 | 1000 ± 20% RSD |
| F | t-butyl mercaptan | 5 | 2063 ± 20% RSD |
| G | diethyl sulphide | 5 | 4550 ± 4% RSD |
| H | ethyl mercaptan | 1 | 969 ± 3.8% RSD |
| I | ethyl mercaptan | 5 | 4803 ± 4.6% RSD |
| J | dimethyl ether | 5000 | 500000 ± 17% RSD |

From the sample preparation follows that methyl acetate dissolves well at low temperatures.

It also follows that some odorants do not dissolve well at very low temperatures. They crystallize out.

Measurements were performed on the labelled or odorized natural gas before liquefaction. In other words, measurements were performed on labelled or odorized NG. The measurements were performed using a gas detector and by smelling.

Measurements on Labelled or Odorized Natural Gas Using a Gas Cylinder:

| Sample | Amount of odorant (using gas detector) [ppm] | Odor at 20% LEL |
|---|---|---|
| A | 5 ± 0.3% RSD | Yes |
| B | 5 ± 0.1% RSD | Yes |
| C | 5 ± 0.2% RSD | No |
| D | 5 ± 0.3% RSD | No |
| E | 1 ± 0.8% RSD | Yes |
| F | 5 ± 0.3% RSD | Yes |
| G | 5 ± 0.1% RSD | Insufficient data |
| H | 1 ± 0.7% RSD | Yes |
| I | 5 ± 0.3% RSD | Yes |
| J | 4947 ± 0.1% RSD | No |

"20% LEL" stands for 20% of lower explosion limit.
"Odor at 20% LEL" stands for whether or not odor could be smelled at 20% LEL.
"RSD" stands for relative standard deviation.

Measurements were performed on the labelled or odorized natural gas which was liquefied in the cryostat. In other words, measurements were performed on labelled or odorized LNG. The measurements were performed using a gas detector and by smelling.

In the headspace of the cryostat none of the odorants was detected by either gas detection or smelling.

Measurements on Labelled or Odorized LNG in Cryostat:

| Sample | Temperature of liquid [K] | Pressure [PSI] | Odor at 20% LEL |
|---|---|---|---|
| A | 114 | 18 | Yes |
| B | 124 | 35 | Yes |
| C | 114 | 18 | Yes |
| D | 114 | 18 | No |
| E | 114 | 18 | Yes |
| F | 114 | 18 | Yes |
| G | 114 | 18 | Insufficient data |
| H | 114 | 18 | Yes |
| I | 114 | 18 | Yes |
| J | 114 | 18 | No |

Measurements on Boil Off Gas of the Odorized LNG:

| Sample | Boil off gas (using gas detector) [ppb] | Odor at 20% LEL |
|---|---|---|
| A | 0 | Insufficient data |
| B |  | Yes |
| C |  | No |
| D | 100 ± 8 RSD | No |
| E |  | No |
| F |  | No |
| G |  | No |
| H |  | Insufficient data |
| I |  | Yes |
| J |  | No |

From the above data follows that methyl acetate is suitable to be used as tracer. From the above data is clear that ethyl acrylate and ethyl mercaptan are suitable to be used as odorant for LNG.

That which is claimed is:

1. A labelled methane comprising fluid comprising:
    a methane comprising fluid,
    methyl acetate, in a range of from 1 to 250 ppm, calculated on the total mass of the labelled methane comprising fluid;
    an odorant in a range of from 1 to 100 ppm, and
    a carrier in a range of from 0.1 to 10 m/m %, calculated on the total mass of the labelled methane comprising fluid;
wherein the carrier is propane, n-butane, iso-butane, or a mixture of two or more thereof, and
wherein the odorant is ethyl acrylate, ethyl mercaptan, or a mixture thereof,
wherein the labelled methane comprising fluid is a liquid, or a slush of liquid and solids.

2. The labelled methane comprising fluid according to claim 1, wherein the labelled methane comprising fluid comprises 2 to 10 ppm odorant, calculated on the total mass of the labelled methane comprising fluid.

3. The labelled methane comprising fluid according to claim 1, wherein the labelled methane comprising fluid comprises 4 to 6 ppm odorant, calculated on the total mass of the labelled methane comprising fluid.

4. The labelled methane comprising fluid according to claim 1, wherein the carrier is iso-butane.

5. The labelled methane comprising fluid according to claim 1, wherein the odorant is ethyl acrylate or a mixture of ethyl acrylate and ethyl mercaptan.

6. A fuel for automotive industry, marine industry, or for power generation, comprising an odorized methane comprising fluid according to claim 1.

7. The labelled methane comprising fluid according to claim 1, wherein the labelled methane comprising fluid is at a temperature in the range of from −62° C. to −185° C., and at a pressure in the range of from 20 mbara to 120 bara.

8. The labelled methane comprising fluid according to claim 7, wherein the odorized methane is at a pressure of from 250 mbara to 76 bara.

9. A process for preparing a labelled methane comprising fluid comprising methyl acetate in a range of from 1 to 250 ppm, the process comprising the following steps:
    a) adding methyl acetate to a methane comprising liquid, or a methane comprising slush of liquid and solids;
    b) adding an odorant in a range of from 1 to 100 ppm, and a carrier in a range of from 0.1 to 10 m/m % wherein the odorant and the carrier are added separately and/or mixed, and
wherein the methyl acetate is added separately and/or mixed with the odorant and/or the carrier, and
wherein the carrier is propane, n-butane, iso-butane, or a mixture of two or more thereof, and
wherein the odorant is ethyl acrylate, ethyl mercaptan, or a mixture thereof.

10. The process according to claim 9, comprising the following steps:
    b1) adding the odorant to the carrier and
    b2) adding at least a part of the mixture obtained in step b1) to a methane comprising liquid, or a methane comprising slush of liquid and solids, and adding methyl acetate separately and/or mixed with the odorant and the carrier.

11. The process according to claim 9, wherein a stream comprising a tracer and/or the odorant is added to a gas stream, the liquid stream, or the stream of a slush of liquid and solids, using a flow controller or an injection pump and a PLC (programmable logic controller).

12. The process according to claim 9, wherein the liquid or slush comprising methane is at a temperature in a range of from −62° C. to −185° C., and at a pressure in a range of from 20 mbara to 120 bara.

13. The process according to claim 12, wherein the liquid or slush comprising methane is at a pressure in a range of from 250 mbara to 76 bara.

14. A process for preparing a labelled methane comprising fluid comprising methyl acetate in a range of from 1 to 250 ppm, the process comprising the following steps:
 a) adding methyl acetate to a methane comprising gas;
 b) adding an odorant in a range of from 1 to 100 ppm of an odorant, and in a range of from 0.1 to 10 m/m % of a carrier to methane comprising gas,
 wherein the odorant and carrier are added separately and/or mixed, and
 wherein the methyl acetate is added separately and/or mixed with the odorant and/or the carrier, and
 wherein the carrier is propane, n-butane, iso-butane, or a mixture of two or more thereof, and
 wherein the odorant is ethyl acrylate, ethyl mercaptan, or a mixture thereof; and
 c) liquefying the mixture obtained in step a) to a temperature in a range of from −62° C. to −185° C. and a pressure in a range of from 20 mbara to 120 bara.

15. The process according to claim 14, comprising the following steps:
 b1) adding the odorant to the carrier, and
 b2) adding at least a part of the mixture obtained in step b1) to the methane comprising gas,
 wherein the methane comprising gas preferably is at a temperature in a range of from −40 to +200° C., and
 adding the methyl acetate separately and/or mixed with the odorant and the carrier, and
 c) liquefying the mixture obtained in step 2) to a temperature in a range of from −62° C. to −185° C. and a pressure in a range of from 20 mbara to 120 bara.

16. The process according to claim 14, wherein the methane comprising gas is at a temperature in a range of from −25 to +85° C.

17. The process according to claim 14, wherein the pressure in step (b) is in a range from 250 mbara to 76 bara.

* * * * *